United States Patent [19]

Nelson et al.

[11] Patent Number: 5,050,526
[45] Date of Patent: Sep. 24, 1991

[54] BOAT ATTACHMENT

[76] Inventors: Lee N. Nelson, 14722 Lone Eagle Dr., Fla. 32821; James J. Powers, III, 3176 Crested Cir., both of Orlando, Fla. 32821

[21] Appl. No.: 396,047

[22] Filed: Aug. 21, 1989

[51] Int. Cl.⁵ .............................. B63B 17/00
[52] U.S. Cl. ........................ 114/364; 43/55; 43/57; 224/920
[58] Field of Search .............. 114/347, 363, 364; 43/54.1, 55, 56, 57; 62/371, 372; 224/920

[56]  References Cited

U.S. PATENT DOCUMENTS

| | | | |
|---|---|---|---|
| 299,765 | 6/1884 | Evans | 43/57 |
| 1,929,833 | 10/1933 | Van Vuren | 43/54.1 |
| 2,403,858 | 7/1946 | Groom et al. | 62/371 |
| 2,491,114 | 12/1949 | Julin | 62/371 |
| 2,800,741 | 7/1957 | Adams | 43/55 |
| 3,196,516 | 7/1965 | Thomas | 43/56 |
| 3,509,657 | 5/1970 | Bross | 43/57 |
| 3,843,082 | 10/1974 | Garrett | 114/364 |
| 4,146,279 | 3/1979 | Stahl | 114/363 |
| 4,353,182 | 10/1982 | Junkas et al. | 224/920 |
| 4,380,208 | 4/1983 | Goserud | 114/364 |
| 4,528,925 | 7/1985 | Pyburn | 114/364 |
| 4,593,642 | 6/1986 | Shay | 114/347 |
| 4,667,484 | 5/1987 | Tarozzi et al. | 62/371 |
| 4,829,698 | 5/1989 | McDonald | 43/57 |

Primary Examiner—Sherman Basinger
Assistant Examiner—Thomas J. Brahan
Attorney, Agent, or Firm—William M. Hobby, III

[57] ABSTRACT

A live well for fish, bait well and ice chest attachment for a boat has an elongated container having a bait container formed therein and having a separate insulated ice chest formed therein. The elongated container has a cross-section of the approximate cross-section of a fishing boat and has a plurality of straps fixedly attached to each end of the elongated container. A hook bracket is attached to the other end of each of said plurality of straps and shaped to hook over each side of a boat gunnel. Each of the plurality of straps has a loop on one end and is located in an opening on one end portion of the container and a rigid rod inside the container extends through each loop. A pair of separate handles can be attached to the gunnel hooks for handling the boat attachment.

8 Claims, 2 Drawing Sheets

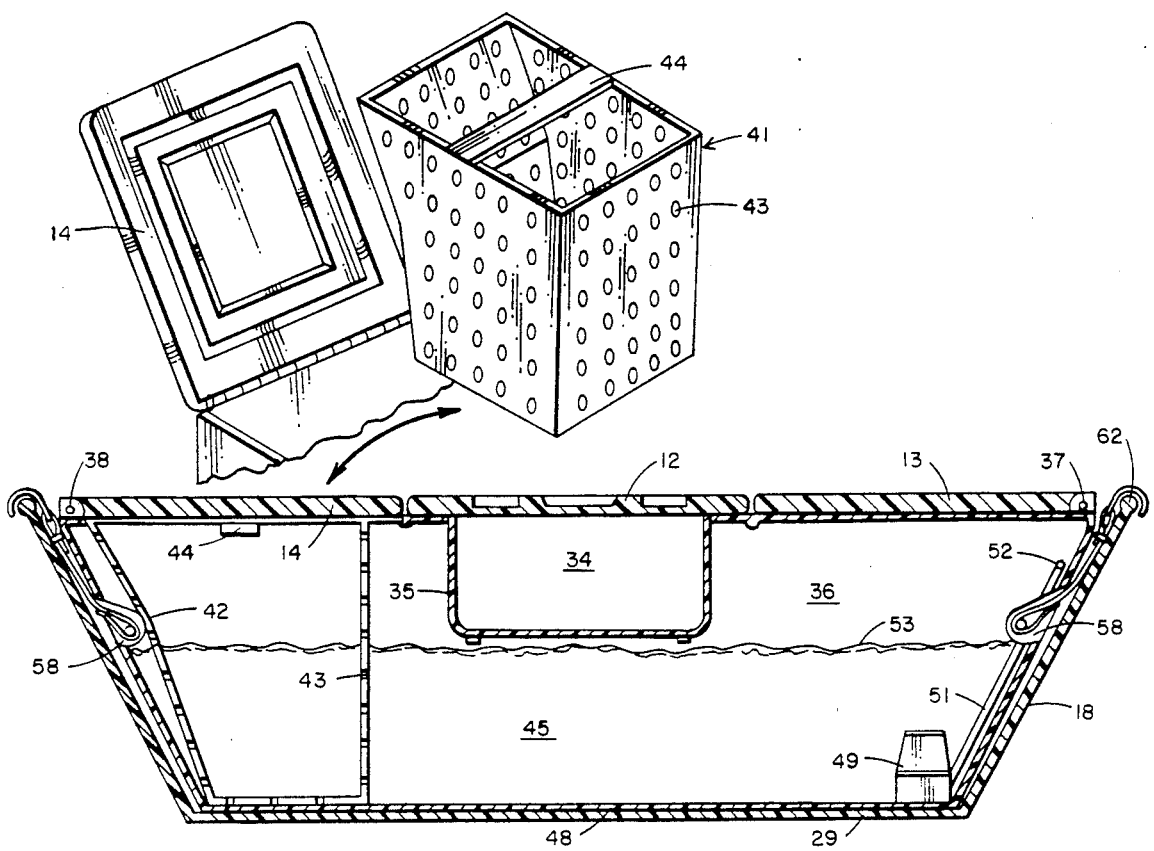
FIG. 3
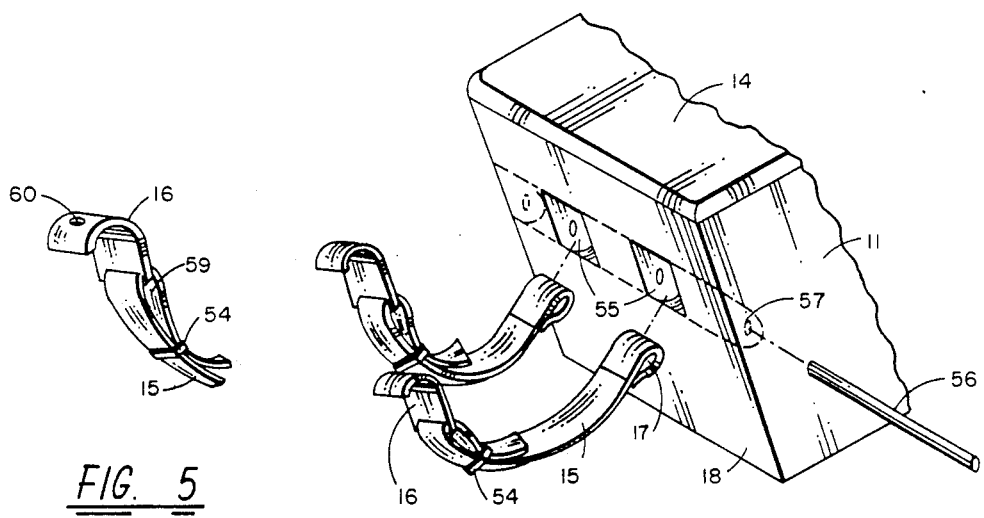
FIG. 5
FIG. 4

5,050,526

BOAT ATTACHMENT

BACKGROUND OF THE INVENTION

The present invention relates to an attachment for a fishing boat and especially a live well for fish, bait well and ice chest attachment formed to quickly attach to the gunnels of a fishing boat and which can be easily removed and used out of the boat.

In the past a wide variety of attachments have been provided for boats including fishing boats and these include various attachable bait boxes which are added to boats in different positions for carrying bait for use in fishing. Typical prior art attachments for boats can be seen in the Ganong U.S. Pat. No. 2,473,874 for a bait box for adding to a boat. The Rossman U.S. Pat. No. 4,266,707 is for a boat seat tackle box which is attached to an existing boat and forms a seat and tackle box combination. The Carlson U.S. Pat. No. 3,958,289 has an attachable storage compartment attached to a canoe and attaches across the center of the canoe. The Mathieu U.S. Pat. No. 4,398,488 teaches a removable canoe carrying cooler which is readily attachable to a canoe and has a built-in cooler and is attached across the center of the boat. The Shay U.S. Pat. No. 4,593,642 is a carrying case which attaches to the sides of a canoe and is supported in the center thereof.

The present invention is for a boat attachment which is adapted to add to an existing fishing or John boat and is shaped to fit the cross section of the boat and to be held with adjustable, flexible straps with hook brackets specifically designed to hook over the edge of the gunnels of the boat to support the attachment on the sides of the boat and is suspended above the bottom of the boat which has a top portion which includes an ice chest and a lower portion that is both a live well and a bait well which may have insulated portions thereof. The adjustable cinch straps with hook attachments advantageously allows for a dowel handle to be inserted therein in place of the gunnel for toting the boat attachment and allows the attachment to be used for shore or pier fishing.

SUMMARY OF THE INVENTION

The present invention relates to a boat attachment and especially to a fishing boat attachment which forms a live fish well, bait well and ice chest which is readily attachable to a conventional John boat and V-hull boats. An elongated container has a separate insulated ice chest formed therein and formed a fish and bait well container and has a pair of angled end portions shaped to fit the cross-section of a conventional fishing boat. A plurality of adjustable, flexible cinch straps are fixedly attached to each end of the elongated container, each of the adjustable straps has a hook bracket attached thereto and is shaped to fit over the edge of a boat gunnel to hold the elongated container transverse between the boat sides. The elongated container may have a removable bait bucket, along with an aerator in the live well. A pair of adjustable flexible cinch straps on each end of the container are placed in openings in each end portion of the container and a rod is slid through a loop formed in each strap inside the fish well to hold the straps therein. The straps are adjustable for different boats. A pair of handles may be provided to fit within the hook brackets for toting the elongated container which can act as a live fish well, bait well, ice chest, and seat for shore or pier fishing.

BRIEF DESCRIPTION OF THE DRAWINGS

Other objects, features, and advantages of the present invention will be apparent from the written description and the drawings in which:

FIG. 3 is a sectional view taken through a fishing boat and boat attachment in accordance with FIG. 2 having the bait basket and bait well cover in an exploded view;

FIG. 4 is a perspective view of one end portion of the bait basket of FIG. 1 having straps exploded therefrom; and FIG. 5 is a perspective view of one strap end.

DESCRIPTION OF THE PREFERRED EMBODIMENT

Figure 1:
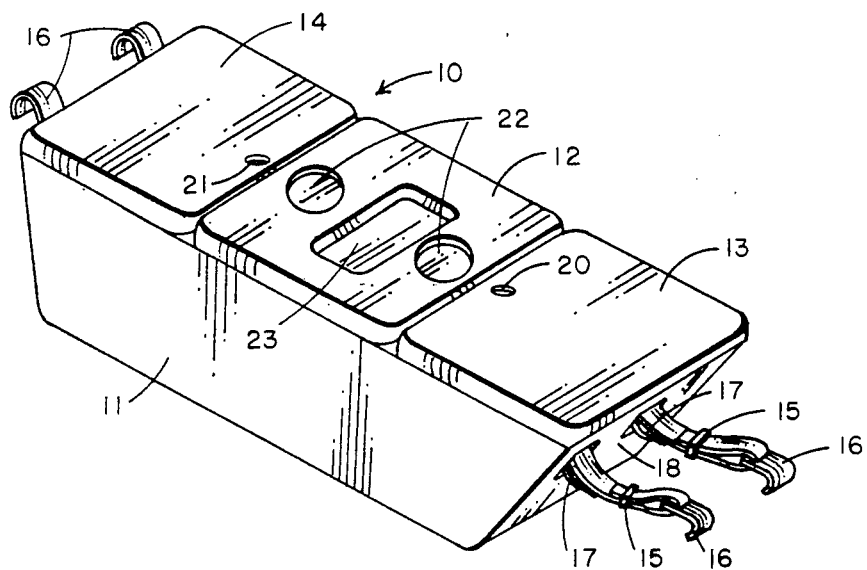
FIG. 1 is a perspective view of a boat attachment in accordance with the present invention.
Figure 2:
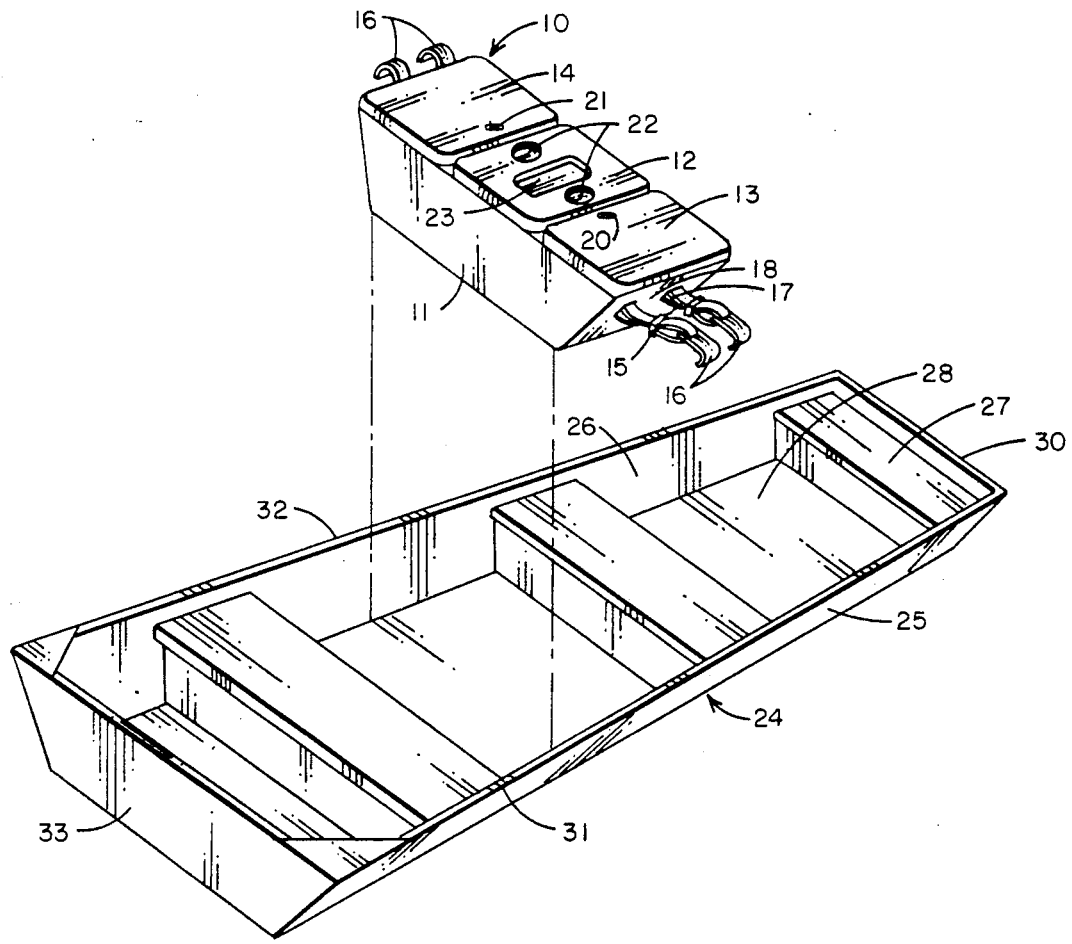
FIG. 2 is an exploded view of the boat attachment of FIG. 1 being attached to a fishing boat.

Referring to FIGS. 1 through 5 of the drawings, and especially FIGS. 1 and 2, a boat attachment 10 for use as an live fish well, bait well and ice chest is provided with an elongated container 11 having an ice chest top 12 in the center and the fish well top 13 at one end and a bait well top 14 at the other end thereof. A plurality of adjustable, flexible straps 15, each has a gunnel hook bracket 16 attached to one end thereof and has at the other end 17 a loop of the strap 15 fixedly attached to an angled end 18 of the container 11. Top 13 has a finger opening 20 while the top 14 has a finger opening 21. The ice chest top 12 has a pair of cup or glass holders 22 and a molded tray 23 formed therein. The entire container and top may be formed of a molded polymer or a molded foamed polymer and provides sufficient rigidity for supporting an individual sitting thereon as a seat such as on a pier or otherwater front. The container can be readily attached to a fishing boat 24 which may be a standard boat having a pair of gunnels 31 and 32 with a plurality of seats 27 formed therein as well as a bottom 28, a bow 30, and a transom 33. The sides 25 and 26 are angled as are the end portions 18 of the boat attachment, so that the cross-section of the elongated container 11 is shaped to closely follow the cross section of the boat 24 having the hooks 16 shaped to tightly fit over the gunnel edges 31 and 32 to hold the boat attachment 10 in place in the boat supported on the boat gunnels.

As seen in FIG. 3, an ice chest 34 has shaped sides 35 and a top 12 which is hinged at the back to the edge of the container 11. The door 13 of the live fish well 36 is hinged at 37 to the edge of the container 11 and the door 14 is hinged at 38 on the opposite end portion 18 of the container 11. In FIG. 3 a bait basket 41 is formed to exactly fit in one end portion of the live well 36 and has a form fitting portion 42 in the area 58 along with a plurality of openings 43 on walls of bait basket 41 and a cross brace 44 which can serve as a handle. Top 14 can be opened and the bait basket readily pulled up for grasping the bait normally maintained in the water 45 in the live well 36. A live well aerator 49 may be a bilge pump if desired for aeration and can circulate water in through the live well 36 through PVC tubing 51 and out a nozzle 52 above the water level 53 of the water 45 to continuously aerate the water in the live well 36 and bait basket 41.

As seen in FIGS. 4 and 5, an adjustable strap 15 having the gunnel hooks 16 on the end thereof have a loop 17 on the other end as well as an adjustable buckle 54 for adjusting the length of the strap 15. The loops are slid in openings 55 in the end portions 18 of the containers 11 and may have a steel, wood or metal rod 56 slid through the loops 17 on the inside of the bait well 36 to hold the straps to the container 11 from inside the live well. The rod 56 with the straps attached may have a molded polymer portion 58 for holding the rod and straps in place.

In FIG. 5, the buckle 54 can be more clearly seen holding the strap 15 and having a loop 59 for holding the hook brackets 16. Thus, the straps 15 can be taken up or let out to adjust for a particular boat. The hooks 16 may be aluminum hook brackets shaped to fit over the side edge of a boat gunnel and may have a rubberized coating over them to protect the gunnels 31 and 32 from being scratched and stop the boat attachment 10 from shifting while the boat is moving. Aperture 60 may be placed in the brackets 16 for attaching a set screw into the gunnel edge 62. It should be clear that the container can be removed from the boat and the cylindrical gunnel edge 62 replaced with a pair of dowels or other handle members running between hook brackets 16 used as handles for carrying the boat attachment onto a pier or the like for use as a live well, bait well, ice chest and seat during fishing outside of a boat.

Accordingly, the present invention is not to be construed as limited to the forms shown which are to be considered illustrative rather than restrictive.

I claim:

1. An attachment for a fishing boar comprising:
   an elongated container having a well container formed therein, and having a separate insulated ice chest formed therein and said container having a pair of end portions shaped to follow the sides of a fishing boat and said elongated container having a plurality of doors opening thereinto, one said door opening into said ice chest which door is a formed tray having glass holding coasters formed therein;
   a bait container shaped to fit inside said well;
   a plurality of flexible straps fixedly attached to each end of said elongated container, each said flexible strap being adjustable whereby adjustments can be made for different boats, and each said strap having a loop formed on one end thereof and inserted in said opening in the end of said container and being attached to said container and a pair of strap holding rods located in said container;
   a pair of strap holding rods located in said container and each said strap holding rod being passed through two of said strap loops to hold said straps to said container; and
   a plurality of hook brackets, one hook bracket attached to each said strap and shaped to hook over each side of a fishing boat gunnel, said container being suspended with the adjustable flexible straps and hook brackets attached to the boat gunnels.

2. An attachment for a fishing boar in accordance with claim 1 in which said each strap holding rod and each said strap loop has a polymer formed thereover adjacent the interior wall of said container.

3. An attachment for a fishing boat in accordance with claim 2 in which said container has an aerator therein including a pump placed adjacent the bottom of said container and a tube extending therefrom to above the bait well water line.

4. An attachment for a fishing boar in accordance with claim 3 in which said bait container has a plurality of openings therein and a handle attached thereto.

5. An attachment for a fishing boat in accordance with claim 4 in which each of said elongated container doors is hinged to on side of the top of said container.

6. An attachment for a fishing boat in accordance with claim 5 in which said bait container has a bar fixedly attached across the top thereof to form said bait container handle.

7. An attachment for a fishing boat in accordance with claim 1 in which each said hook bracket has a rubberized coating thereon.

8. An attachment for a fishing boat in accordance with claim 1 in which each said hook bracket has an aperture therethrough for attaching said hook to a boat gunnel for mounting said container to said boat.

* * * * *